Sept. 25, 1951
C. E. MORRELL ET AL
2,569,384
RECOVERY OF OXYGENATED COMPOUNDS
FROM HYDROCARBON OILS
Filed Dec. 19, 1947
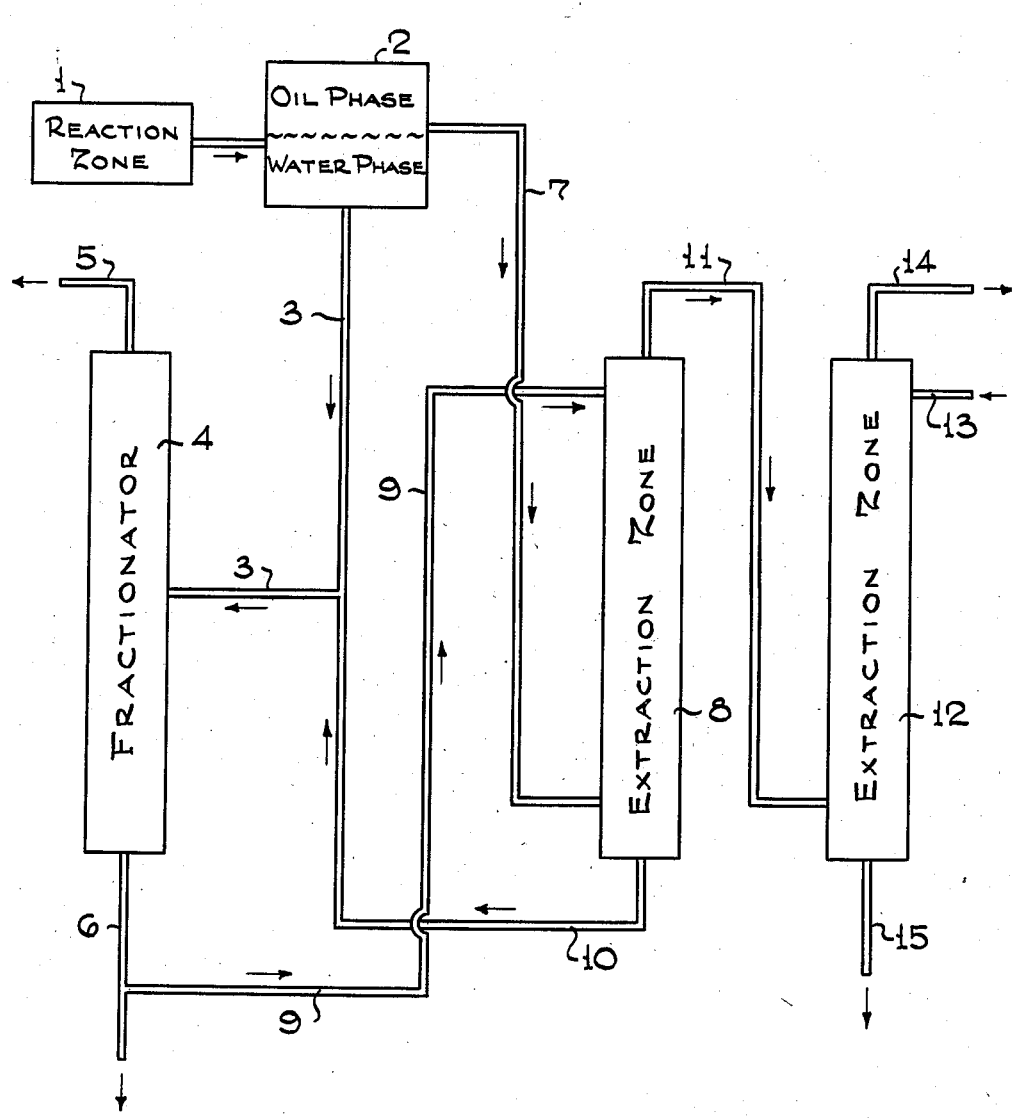
Charles E. Morrell
James H. McAteer  Inventors
By Henry Berk  Attorney Patented Sept. 25, 1951

2,569,384

UNITED STATES PATENT OFFICE 2,569,384

RECOVERY OF OXYGENATED COMPOUNDS FROM HYDROCARBON OILS

Charles E. Morrell, Westfield, and James H. McAteer, Cranford, N. J., assignors to Standard Oil Development Company, a corporation of Delaware Application December 19, 1947, Serial No. 792,802

11 Claims. (Cl. 260—450)

This invention relates to the recovery of the lower molecular weight neutral oxygen-containing organic compounds from mixtures thereof with hydrocarbon oils by a process involving the extraction of such mixtures with dilute aqueous carboxylic acid solutions, such as dilute aqueous acetic acid, dilute aqueous propionic acid, etc., or mixtures of the same.

Various processes are known to the art in which a mixture of hydrocarbons and organic oxygen-containing compounds are produced. Some of these processes are the low temperature carbonization of coal, peat and similar materials, the destructive hydrogenation and distillation of coals, wood, shales, etc. Numerous oxidation processes, particularly oxidation of petroleum oil fractions, such as is described in Ellis' Chemistry of Petroleum Derivatives, vol. 1, chapter 36, pages 830 to 845, also yield mixtures of oxygenated compounds and hydrocarbons of substantially the same boiling range. This invention is particularly applicable to the hydrocarbon syntheses, such as the Fischer synthesis wherein oxides of carbon are reacted with hydrogen in the presence of catalysts to produce synthetic hydrocarbons, water and numerous organic oxygenated compounds, predominantly aliphatic. The oxygenated compounds produced in the synthesis operation may be a major product or a relatively small by-product depending upon the operating conditions. These oxygenated materials which are extremely valuable as chemicals, consist of a mixture of alcohols, acids, aldehydes, ketones and esters and are difficult to separate from the hydrocarbon oil because first, they are so numerous, secondly they boil within substantially the same range as the hydrocarbon oils and, thirdly, they often form azeotropes with each other and with the hydrocarbon oils.

Normally when the products of the above-described synthesis operation are condensed and allowed to settle, the condensate separates into a di-phase system, that is, an upper oil layer comprising substantially hydrocarbons and hydrocarbon-soluble oxygen-containing materials and a lower water phase comprising substantially water and water-soluble oxygen-containing materials. The oxygen-containing organic compounds formed in the synthesis operation range from very low molecular weight compounds to very high molecular weight compounds and therefore find themselves distributed throughout the oil phase and the water phase depending on their solubilities in these respective phases. In general, it can be said that the bulk of the organic oxygen-containing compounds of one to four carbon atoms will enter the aqueous phase while the bulk of the compounds containing five carbon atoms and more per molecule will be found in the oil layer, although it should be borne in mind that the separation of materials into their respective phases is oftentimes not cleancut and depends to a large extent upon the conditions involved and the over-all composition of the materials in the condensate from the synthesis reactor.

Processes have been developed for the separation and recovery of alcohols, ketones, aldehydes, etc. from the water layer. The starting point in many of such processes is a crude alcohol distillation in which the water layer is subjected to distillation to remove substantially all of the oxygenated compounds other than acids therefrom. Generally speaking, it is desired to leave the acids, such as acetic acid, propionic acid, etc., in the bottoms from which they are subsequently recovered.

It is an object of this invention to provide a method for the recovery of oxygenated compounds, particularly water-soluble oxygenated compounds from mixtures thereof with hydrocarbon oils.

It is an object of this invention to provide a method for the recovery of oxygenated compounds from the synthesis oil layer.

It is also an object of this invention to provide a method for the separation and recovery of neutral organic oxygenated compounds and of acidic organic oxygenated compounds from mixtures of both with hydrocarbon oils.

It is also an object of this invention to provide a means for allowing the oxygenated compounds normally included in the synthesis oil layer to be purified and concentrated along with the oxygenated compounds normally obtained in the water layer.

These and other objects of this invention are attained by carrying out the extraction of a mixture of neutral and acidic oxygenated organic compounds in hydrocarbon oils with a dilute aqueous solution of acetic acid which may or may not contain small amounts of homologues of acetic acid. The acid bottoms obtained from the fractional distillation of the synthesis water layer is especially suitable for this extraction step as will be further explained below.

The material subjected to extraction, according to the terms of this invention, is complex in nature. It is composed of hydrocarbons including paraffins, olefins and in some cases, small amounts of aromatics. In addition, it contains anywhere up to about 50% or more of oxygen-containing materials, particularly of high molecular weight such as those set out above. In cases where the material is derived from the hydrocarbon synthesis operation, the oil will have dissolved in it alcohols, acids, aldehydes, ketones and esters. Frequently, the esters predominate among the high boiling compounds, particularly that fraction boiling above 350° F. while carbonyl compounds, that is aldehydes and ketones, acids and alcohols, predominate among the oxygen-containing compounds boiling at temperatures up to about 350° F. Ordinarily the amounts of alcohols and acids found decrease with increasing analytical distillation temperatures due undoubtedly to the fact that they undergo esterification reactions during such distillation treatments. The oxygen content of the hydrocarbon oils resulting from the synthesis operation generally runs from one weight percent to ten weight percent.

It has been found that when such a mixture of hydrocarbon oils and oxygenated compounds is extracted at low temperatures with a dilute aqueous solution of acetic acid with or without a small amount of its homologues, the lower molecular weight neutral oxygenated compounds present in the mixture are extracted therefrom by the acid solvent, leaving the lower molecular weight acids contained in the mixture in the raffinate phase with the hydrocarbon oils. That is to say, the alcohols, esters, ketones, aldehydes, acetals, etc., through $C_5$ and some $C_6$, are dissolved by the dilute aqueous acetic acid and constitute the extract phase, while the acids present in the mixture are undissolved and together with the hydrocarbon oils in the mixture constitute the raffinate phase.

The dilute aqueous acetic acid solution employed as the selective solvent according to the terms of this invention should contain no more than 5 to 10 weight per cent of acetic acid. The preferred range is 2 to 5 weight per cent. If other higher homologues of acetic acid are present they should be restricted to no more than about 35 weight per cent based on the weight of acetic acid.

The acid water bottoms obtained from the fractional distillation of the synthesis water layer contains about 95 weight per cent water and a typical analysis is as follows:

| | Weight percent |
|---|---|
| Water | 95.50 |
| Carboxylic acids[1] | 4.47 |
| Other org. oxy. compds.[2] | 0.03 |
| | 100.00 |

[1] As acetic acid.
[2] Alcohol, esters, etc.

The 4.47 weight percent acid content is broken down into approximately 75 weight percent acetic acid, 20 weight percent propionic acid, and 5 weight percent butyric acid and higher acids. The small amount of other oxy-compounds present in the acid bottoms, i. e. the 0.03 weight per cent alcohol, ester, etc., is not harmful to the material as a solvent.

In its simplest form this invention entails taking all or part of the aqueous acidic bottoms from the hydrocarbon synthesis water layer from which substantially all of the alcohols, ketones, aldehydes, etc., have been removed and contacting the oil layer resulting from the synthesis product condensation with the aqueous bottoms under extraction conditions. The total oil layer or appropriate fractions thereof may be so treated. In a number of cases these bottoms may be used as such for the extraction operation. This is especially true when it is desired to extract the oxygenated compounds from the lower boiling portions of the Fischer synthesis oil, say for instance the gasoline fraction (up to 400° F.), or some lower boiling portion of the gasoline fraction. This invention also includes an alternate possibility in which a lower alcohol such as methyl, ethyl or isopropyl or mixtures of these lower alcohols or mixtures of these with other neutral oxygenated compounds such as ketones are added to the aqueous acidic bottoms and this mixture employed as the extraction agent. For instance, if the entire Fischer synthesis oil is to be extracted or if only the higher boiling portions thereof are extracted, it is desirable that considerable amounts of the lower boiling oxygenated compounds be added to the aqueous bottoms in order to obtain a suitable solvent for the extraction. Preferably, however, the amount of alcohols or other low boiling oxygenated compounds combined with the aqueous bottoms is kept at the lowest value consistent with reasonable capacity and selectivity of the extraction agent for the oil-soluble oxygenated compounds. Best results have been obtained by the addition of at least 20 volume per cent alcohol, particularly methanol.

The aqueous bottoms, either as such or after reinforcement with lower boiling oxygenated compounds as described above, may be contacted with the oil or suitable fractions thereof under a variety of conditions. For instance, the contacting may be carried out in a batch manner. Preferably, however, it is carried out using countercurrent flow of the extractant and the oil, either in counter-stage equipment or in a countercurrent packed or plate tower. The optimum solvent to oil ratio will vary over wide ranges depending upon the nature of the solvent, i. e. the acid and lower boiling oxygenated compound-content thereof, the oxygenated compound content of the oil, the boiling range of the oil being extracted, and the temperature of the extraction. As the oxygenated compound content of the solvent is increased, the optimum solvent/oil ratio, in general, decreases. Also the lower the oxygenated compond content of the oil feed, the lower the solvent/oil ratio requirements. When extracting the higher boiling portions of the oil, either alone or in combination with the lower boiling portions thereof, in general it is desirable to use a relatively high solvent/oil ratio since the solubility of the higher boiling oxygenated compounds in such aqueous solvents is lower than that of the lower boiling ones.

The temperature maintained in the extraction operation may be varied over a limited range, viz. from the freezing point of the solvent, i. e. around 0° C. up to about 125° C. Temperatures much above 100° C. are to be avoided when extracting with aqueous acetic acid or aqueous acid bottoms due to the fact that at these higher temperatures acids tend to become extracted from the oil layer as described in our copending application Serial Number 7,966, filed February 12, 1948. In general, we have found that extraction temperatures in the range of 25° C. to 100° C. are preferable.

As previously stated, one advantage of this type of operation is that it permits the recovery of the neutral oxygenated compounds from the oil in such a manner (i. e. substantially free of organic acids higher than acetic) that they may be more advantageously worked up along with the oxygenated compounds recovered from the water layer. Another definite advantage is that the carboxylic acids remaining in the raffinate may be easily extracted therefrom with water at temperatures between 0° C. and 250° C., preferably at 165° C. to 250° C., thereby building up a concentration of carboxylic acids to such an extent that acid recovery therefrom is made economically feasible.

The fat solvent from the aqueous acid extraction operation is preferably subjected to distillation to remove therefrom substantially all the alcohols, ketones, aldehydes, esters and acetals. The aqueous acid bottoms may be further used in part as an extraction solvent in the oil extraction step and/or in part sent to an acid recovery operation.

The attached drawing represents a flow plan of one process and accompanying apparatus for carrying out this invention in its simplest embodiment.

Referring to the drawing, numeral 1 represents a reaction zone which produces a reaction product composed chiefly of hydrocarbons and oxygenated compounds, which when removed from the reaction and condensed, form in vessel 2 an upper hydrocarbon oil phase and a lower water phase, each phase containing dissolved therein varying amounts of organic oxygenated compounds such as alcohols, acids, ketones, aldehydes, etc., as explained previously. The water phase is removed via line 3 to zone 4 which may be a fractional distillation zone, an extractive distillation zone or a solvent extraction zone for separation of the water layer oxygenated compounds into the neutral oxygenated compounds taken overhead via line 5, and the acids removed as bottoms via line 6. The oil phase from vessel 2 is removed via line 7 to extraction zone 8 entering at a point below the mid-section thereof. In extraction zone 8 the oil phase is countercurrently extracted with all or part of the acid bottoms entering the extraction zone via line 9 at a point near the top thereof. During the extraction operation the lower molecular weight neutral oxygenated compounds in the oil layer are extracted by the aqueous acid and the resulting extract is removed for separation of solvent therefrom via line 10. This may be conveniently accomplished by introducing the extract into fractionation zone 4 via line 3. Raffinate from extraction zone is removed overhead via line 11 and consists chiefly of hydrocarbon oils, higher molecular weight oxygenated compounds and all the carboxylic acids originally contained therein, both low molecular weight and high molecular weight. This raffinate is led to water-extraction tower 12 entering at a point below the mid-section thereof. Water enters the tower at a point near the top via line 13 and the raffinate is countercurrently washed at a temperature between 0° C. and 250° C., preferably at about 165° C. to 250° C. to extract the lower molecular weight acids therefrom. Hydrocarbons substantially free of the lower molecular weight oxygenated compounds are removed from the extraction zone via line 14 and recovered for purification as gasoline and/or further recovery of the higher molecular weight oxygenated compounds therefrom. Aqueous acids are removed from the bottom of the zone via line 15 and are sent to storage for acid recovery therefrom such as by distillation, dehydration, conversion to salts, etc.

Although the invention has been illustrated as a tie-in with the recovery of the lower molecular weight neutral oxygenated compounds from the water layer of a hydrocarbon synthesis operation, it is to be understood that the invention is not limited thereto, as the oil phase could be processed independently in the manner outlined for recovery of the lower molecular weight neutral oxygenated compounds and acidic compounds contained therein. Likewise, the invention is not to be restricted by any process by which the acids may be recovered from the raffinate phase. Such recovery may be accomplished as demonstrated by water-washing or, one may resort to other processes as fractional distillation, neutralization, extraction with other solvents, etc.

The fact that it has been found that dilute aqueous acetic acid at temperatures up to 125° C. will not extract carboxylic acids from mixtures thereof with other neutral oxygenated compounds in solution, is an extremely important feature of the recovery processes here illustrated. It is of particular significance when the neutral oxygenated compounds are being recovered from the extract by fractional distillation. If the oil layer were extracted with water the water would remove not only the lower molecular weight neutral oxygenated compounds from the oil layer but the lower molecular weight acids as well. The extract would therefore contain the $C_2$ through $C_5$ acids. The higher homologues of acetic acid, i. e. propionic acid, butyric acid, etc. present in such an extract, form azeotropes with water and, therefore, in a fractional distillation of a synthesis water layer they are divided between the distillation overhead and residue. Some of these interfering water azeotropes are as follows:

| | Boiling Point, ° C. | Weight Per Cent $H_2O$ |
|---|---|---|
| Propionic acid-water | 99.98 | 82.3 |
| Isobutyric acid-water | 99.3 | 79 |
| Butyric acid-water | 99.4 | 81.6 |
| Isovaleric acid-water | 99.5 | 81.6 |

The crude neutral overhead, therefore, would be contaminated by considerable amounts of acids, and the recovery of the acids themselves is thereby made more costly. Furthermore, the addition of the aqueous extract of the oil layer directly to the synthesis water layer which contains usually 2 to 5 weight per cent of acetic acid, further reduces the acetic acid concentration and thereby increases its cost of recovery. This is occasioned by the fact that the amount of acetic acid present in a typical hydrocarbon synthesis oil layer represents an insignificant fraction of that present in the water product layer.

On the other hand, when the oil layer is extracted with dilute aqueous acetic acid at temperatures up to 125° C. only the neutral oxygenated compounds are extracted and when the extract is treated for removal of solvent there is no problem of interference by low boiling acid-water azeotropes of the higher homologues of acetic acid. Thus the neutral oxygenated compounds may be recovered free of contaminating acids. Acetic acid itself forms no azeotrope with water and presents no problem in this regard.

In order to visualize the amount of $C_2$-$C_5$ oxygenated compounds present in the synthesis oil layer, the following data are presented. In a certain hydrocarbon synthesis run the oxygenated compounds extracted by water from the oil layer represented the following approximate percentage increases over the amounts obtained by processing the water layer from the same run.

| | Per cent increase |
|---|---|
| Propionic acid | 15 |
| Propyl alcohol | 20 |
| Butyric acid | 100 |
| Butyl and amyl alcohols | 600 |

The selective nature of the dilute aqueous acid solvent for the extraction of a synthesis oil is demonstrated by the data following in which acid bottoms from a synthesis water layer was employed as the solvent. The acid bottoms solvent (synthesis water layer stripped of volatile neutral oxygenated compounds) contained 4.2 weight per cent organic acids as acetic acid, 0.04 weight per cent alcohols as ethyl alcohol and the balance water.

Example I $C_5+$ fraction of synthesis oil was countercurrently extracted at room temperature with acid water bottoms in a glass packed tower employing two volumes of solvent per volume of oil. The results obtained compared with extraction with water are as follows:

[Feed composition in milliequivalents/gram: acids 0.76, alcohols 0.72, esters 0.14, carbonyls 1.07.]

| Solvent | Water | Acid Bottoms |
|---|---|---|
| Mol Per Cent Extracted: | | |
| Acids | 33 | [1]—1 |
| Alcohols | 54 | 51 |
| Esters | 17 | 9 |
| Carbonyls | 44 | 34 |

[1] Gain in acid content by oil phase, i. e. 1 mol per cent acid (based on amount in the feed) lost to raffinate phase by acid bottoms.

Example II

Similar extraction runs were made at room temperature employing as feed a synthesis gasoline fraction (boiling range 30–205° C.).

[Feed composition in milliequivalents/gram: acids 0.70, alcohols 0.57, esters 0.25, carbonyls 0.65 solvent/feed, volume ratio 0.5:1.]

| Solvent | Water | Acid Bottoms |
|---|---|---|
| Mol Per Cent Extracted: | | |
| Alcohols | 35 | 37 |
| Acids | 12 | [1]—4 |

[1] Gain in acid content by oil phase, i. e. 4 mol % acid (based on amount in the feed) lost to raffinate phase by acid bottoms.

[Solvent/feed, volume ratio 1:1.]

| Solvent | Water | Acid Bottoms |
|---|---|---|
| Mol Per Cent Extracted: | | |
| Alcohols | 47 | 42 |
| Acids | 21 | +1 |

The solvent/feed ratios employed may be varied over a wide range and will be determined in any particular case by the extraction temperature, the equipment employed and desired cleanup of the extractable oxygenated compounds. For most purposes, the optimum range of solvent to feed ratio is 2 or 3 to 1 although operation at from about 0.25 to 1 to as high as 10 to 1 may be carried out satisfactorily.

By the solvent extraction process as described in this invention all the oxygenated compounds containing up to and including five carbon atoms are quantitatively removed from the oil layer with the exception of the esters. The esters of $C_2$ to $C_5$ are, of course, also removed but not quantitatively. In addition, incomplete removal of oxygenated compounds containing 6 carbon atoms and above is also effected. The higher molecular weight oxygenated compounds, i. e. those containing 6 carbon atoms and above, may be more completely removed from the hydrocarbon oil by other methods not a subject of this invention.

Although it is a feature of this invention that the higher homologues of acetic acid are not extracted from the oil phase, and that the neutral oxygenated compounds are thus kept free of such acid contaminants as propionic acid, butyric acid, etc., which interfere with the separation of the neutral compounds, nevertheless, it should be observed that the presence of small amounts of these higher homologues of acetic acid can be tolerated. In the first place, they are inherent in the system from which the acid water bottoms are produced. Secondly, when, as is shown in the examples cited, some acid is lost from the solvent to the raffinate phase, these higher homologues of acetic acid are the ones lost due to the fact that they are more soluble in the oil layer than is acetic acid. Thirdly, although a small amount of these acids are present in the original solvent their concentration is never being increased, so that there is little danger of building up a concentration of higher homologues of acetic acid to such an extent that they would effect extraction of acids from the oil layer or so contaminate the extract as to make their presence damaging to the neutral oxygenated compounds.

Having fully described the invention in a manner such that it may be practiced by those skilled in the art.

What is claimed is:

1. An improved process for the separation and recovery of aliphatic neutral oxygenated compounds comprising alcohols, aldehydes, ketones, esters and acetals, from a mixture of neutral and acidic oxygenated compounds with hydrocarbons which comprises selectively extracting the neutral oxygenated compounds from the mixture in a liquid-liquid extraction by contact with a solvent comprising dilute aqueous acetic acid containing 2% to 10% acetic acid by weight, at a temperature between the freezing point of the solvent and 125° C., separating an extract phase comprising the neutral oxygenated compounds and a raffinate phase comprising the hydrocarbons and acidic oxygenated compounds, and recovering the neutral oxygenated compounds from the extract phase.

2. An improved process for the separation and recovery of aliphatic neutral oxygenated compounds comprising alcohols, aldehydes, ketones, esters and acetals, from a mixture of neutral and acidic oxygenated compounds with hydrocarbons of substantially the same boiling range which comprises selectively extracting the neutral compounds from the mixture in a liquid-liquid extraction by contact with a solvent comprising dilute aqueous acetic acid containing 2% to 10% acetic acid by weight, at a temperature between the freezing point of the solvent and 125° C., separating an extract phase comprising the neutral oxygenated compounds and a raffinate phase comprising the hydrocarbons and acidic oxygenated compounds, and recovering the neutral oxygenated compounds from the extract phase.

3. A process according to claim 1 in which the neutral oxygenated compounds comprising alcohols, aldehydes, ketones, esters and acetals, contain from 1 to 6 carbon atoms per molecule.

4. A process according to claim 1 in which the solvent is aqueous acid bottoms containing not more than 35 weight percent of higher homologues of acetic acid based on the weight of acetic acid recovered from the water layer of a hydrocarbon synthesis reaction product.

5. An improved process for the recovery of neutral aliphatic oxygenated compounds containing 1 to 6 carbon atoms per molecule from a mixture of such neutral oxygenated compounds with hydrocarbons and acidic oxygenated compounds of substantially the same boiling range, said mixture resulting from the catalytic hydrogenation of oxides of carbon which comprises selectively extracting the neutral oxygenated compounds from the mixture in a liquid-liquid extraction by contact with a dilute aqueous solution of acetic acid containing approximately 2 to 5 weight percent of acetic acid, at a temperature between the freezing point of the solvent and 125° C., separating an extract phase comprising the neutral oxygenated compounds and a raffinate phase comprising the hydrocarbons and acidic oxygenated compounds, and recovering the neutral oxygenated compounds from the extract phase.

6. A process according to claim 5 in which the extraction is carried out at a temperature between 0° C. and 125° C.

7. A process according to claim 5 in which the ratio of solvent to feed extracted is between 0.25 to 1 and 10 to 1.

8. An improved process for the separation and recovery of aliphatic neutral oxygenated compounds comprising alcohols, aldehydes, ketones, esters and acetals, and of organic acidic oxygenated compounds from mixtures thereof with hydrocarbons which comprises selectively extracting the neutral compounds from the mixture in a liquid-liquid extraction by contact with a solvent comprising dilute aqueous acetic acid containing 2% to 10 weight percent acetic acid, at a temperature between the freezing point of the solvent and 125° C., separating an extract phase comprising the neutral oxygenated compounds and a raffinate phase comprising the acidic oxygenated compounds and the hydrocarbons, recovering the neutral oxygenated compounds from the extract phase, and recovering the acidic oxygenated compounds from the raffinate phase by extraction with water.

9. A process according to claim 8 in which the acidic oxygenated compounds are recovered from the raffinate by extraction of the raffinate with water at a temperature between 0° C. and 250° C.

10. An improved process for the separation of neutral and acidic oxygenated aliphatic compounds from reaction products produced in a hydrocarbon synthesis reaction whereby oxides of carbon are hydrogenated in the presence of a catalyst to yield a product which when condensed, separates into a hydrocarbon oil phase and an aqueous phase, which comprises separating the hydrocarbon oil phase from the aqueous phase, fractionally distilling the aqueous phase to produce an overhead product comprising essentially neutral oxygenated organic compounds, and an aqueous bottoms comprising 2% to 10% by weight of acetic acid and not more than 35 weight percent of higher homologues of acetic acid based on the weight of acetic acid, extracting the hydrocarbon oil phase in a liquid-liquid extraction at a temperature between about 0° C. and 125° C. with said aqueous bottoms containing the acidic oxygenated compounds, separating an extract phase comprising neutral oxygenated compounds contained in the oil phase and a raffinate comprising the hydrocarbons and acidic compounds contained in the oil phase, combining the extract phase with the original aqueous phase for recovery of neutral compounds therefrom by distillation, and extracting the raffinate with water to recover acidic compounds therefrom.

11. An improved process for the separation of neutral and acidic oxygenated aliphatic compounds from reaction products produced in a hydrocarbon synthesis reaction whereby oxides of carbon are hydrogenated in the presence of a catalyst to yield a product which when condensed, separates into a hydrocarbon oil phase and an aqueous phase, which comprises separating the hydrocarbon oil phase from the aqueous phase, extracting the hydrocarbon oil phase in a liquid-liquid extraction at a temperature between about 0° C. and 125° C. with a dilute aqueous solution of acetic acid containing 2% to 10% of acid by weight, and separating an extract phase comprising neutral oxygenated compounds phase and a raffinate comprising the hydrocarbons and acidic compounds phase.

CHARLES E. MORRELL.
JAMES H. McATEER.

REFERENCES CITED

The following references are of record in the file of this patent:

UNITED STATES PATENTS

| Number | Name | Date |
|---|---|---|
| 1,838,547 | Haslam | Dec. 29, 1931 |
| 2,348,191 | Camelford | May 9, 1944 |
| 2,457,257 | Michael et al. | Dec. 28, 1948 |
| 2,472,219 | Lyons | June 7, 1949 |
| 2,476,788 | White | July 19, 1949 |
| 2,505,752 | Burton | May 2, 1950 |

OTHER REFERENCES

U. S. Naval Technical Mission in Europe, page 90.